Dec. 27, 1960

R. V. YOUNT 2,966,373

TUBULAR INSERTS

Filed Feb. 2, 1959

INVENTOR

RICHARD V. YOUNT

BY *Cushman, Darby & Cushman*

ATTORNEYS

United States Patent Office 2,966,373
Patented Dec. 27, 1960

2,966,373

TUBULAR INSERTS

Richard V. Yount, Fort Lee, N.J., assignor to Imperial Chemical Industries Limited, London, England, a corporation of Great Britain Filed Feb. 2, 1959, Ser. No. 790,646

1 Claim. (Cl. 285—213)

The present invention relates to tubular inserts for protecting the ends of condenser tubes, heat exchanger tubes or the like.

Inserts for protecting the ends of tubes of the above type against corrosion and other deteriorating factors are well known as illustrated by the expired patents to Spanyol, 1,937,600, December 5, 1933, and Bay, 2,157,107, May 9, 1939. The principal object of the invention is to provide certain unique improvements in the general type of insert described in the above noted patents.

Other more specific objects and advantages of the invention will be apparent from the following detailed description and the accompanying drawing wherein like numerals represent the same parts and wherein.

Broadly stated, the invention relates to a tubular insert of thermoplastic material, specifically polyethylene, having liquid inlet and outlet ends, an external diameter in excess of the internal diameter of the tube with which the insert is to be used, extending continuously over from one-third to two-thirds of the length of the insert beginning adjacent the inlet end; and an external diameter over the remaining length of the insert essentially equal to the inner diameter of the tube.

It is a unique feature of the invention that the "expanded" section of the insert, i.e. the portion having the increased diameter, extends from the inlet end of the insert, for a distance equal to at least one-third but not in excess of two-thirds the length of the insert. It is also essential that the external diameter of this section of the insert be at least 0.005 inch greater and up to 0.070 inch or more, than the external diameter of the remaining length of the insert. Surprisingly, it has been found that the use of these features in a polyethylene insert results in a product which is far superior to prior inserts in respect of tightness of fit, protection of the tube, etc. The present inserts are especially useful for use with worn tubes as they tend to flow into the eroded sections and otherwise conform closely to the wear pattern to give a fit not hitherto attainable.

Figure 1:
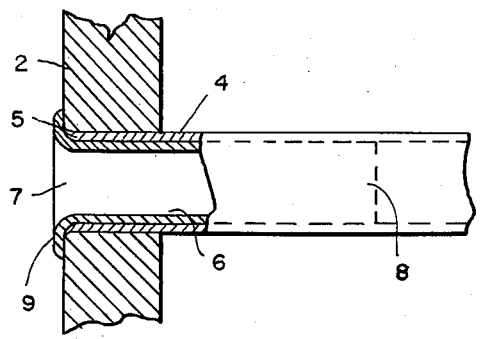
Figure 1 is a fragmental view, partially in section, showing an insert according to the invention in operative association with a condenser tube.

Referring more specifically to the drawings, and particularly to Figure 1 thereof, the reference numeral 2 represents part of a metal condenser tube plate or sheet carrying the usual metal condenser tube 4, the inlet end of which may be flared as shown at 5 to effectively fix the tube to the sheet and to minimize corrosion therebetween and protect the tube-sheet in the area adjacent to the tube from the effect of turbulence and erosion.

The reference numeral 6 stands for the tubular polyethylene insert of the invention, same being frictionally secured within the end of the tube 4 by means of a drive fit. In some instances, particularly in the case where the inner surface of the tube 4 is rough as a result of erosion, a lubricant, such as a water-soluble oil, may be useful as an aid to obtaining a tight fit.

As shown, insert 6 includes inlet and outlet ends 7 and 8, respectively, the inlet end 7 being provided with an appropriate shaped bonnet 9 to effectively cover the flared end 5 of the tube.

Figure 2:
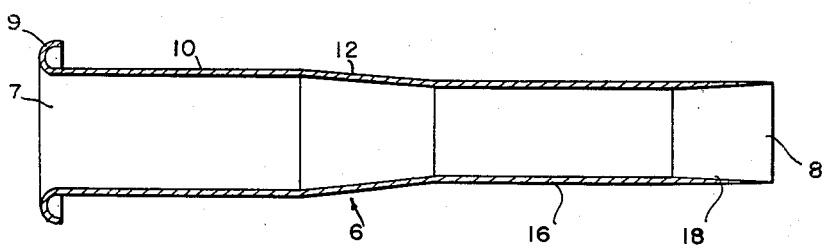
Figure 2 is a longitudinal sectional view of a preferred form of insert in accordance with the present invention and Figures 3 and 4 are longitudinal sectional views of further insert modifications.

In a preferred form of polyethylene insert shown in Figure 2, the "expanded" portion comprises two parts, namely, a section 10 of uniform diameter, as shown, or gradual taper, which for purposes herein shall be described as essentially cylindrical even if slightly tapered, and a tapered section 12 of varying diameter. The expanded portion begins adjacent the inlet end of the insert and extends over about 50% of the length thereof with section 10 about twice the length of the tapered section 12. Typically, if the inner diameter of the tube 4 is 0.777 inch, section 10 may have an external diameter of about 0.802 inch although, as will be appreciated, this can be varied within the limits indicated heretofore.

As shown, the tapered section 12 represents a gradual reduction in the external diameter of the insert 6 from the expanded diameter of section 10 down to the inner diameter of the tube 4. Apart from the expanded portion formed by sections 10 and 12, the rest of the insert comprises the section 16 which, as indicated heretofore, has an external diameter corresponding substantially with the inner diameter of the tube. Section 16 may be truly cylindrical or slightly tapered but, in either case, has a diameter which is essentially the same as the inner diameter of the tube. Typically, in the case of a 6" insert, the length of sections 10, 12 and 16 may be 2", 1" and 3", respectively. While these lengths may vary considerably, the expanded portion should in any case, extend beyond the plate 2.

The internal diameter of the insert of Figure 2 follows the pattern of the outer diameter except for the feathered or tapered section 18 adjacent outlet 8, same being designed to minimize turbulence at this point.

Figure 3:
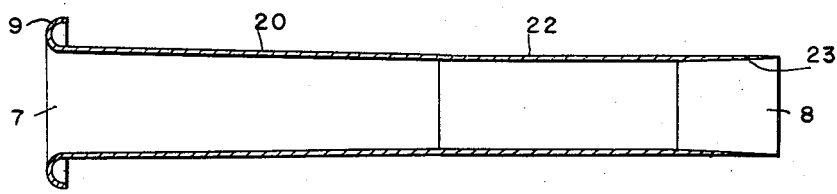

In the modification shown in Figure 3, the expanded portion comprises a uniformly tapered section 20 extending from the inlet end 7 of the insert to the uniformly cylindrical end section 22 of the insert. As in the embodiment of Figure 2, the tapered section 22 has an external diameter adjacent inlet 7 which is between .005" and .070" greater than the inner diameter of the tube and tapers gradually down to the inner diameter of the tube to form the end section 22 somewhere between one-third and two-thirds of the length of the insert. As shown, the inner diameter of the insert of Figure 3 conforms with the pattern of the external diameter except for the feathered end portion 23. Usually, the difference between the inner and outer radius of the insert, i.e. the insert wall thickness, is about 0.020 inch to 0.050 inch although this can be varied.

Figure 4:
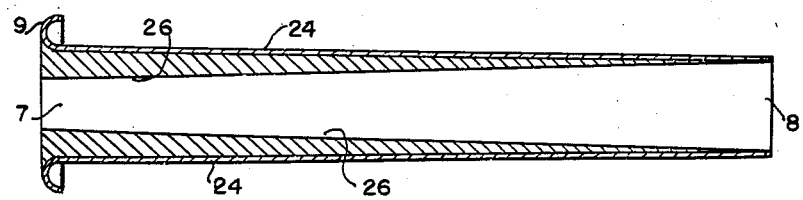

The insert of Figure 4 includes both an inner taper and an outer taper extending the full length of the insert. The outer taper 24 may vary from an insert diameter of at least 0.005 inch in excess of the tube diameter at the insert end 7, typically 0.012 inch, down to the nominal diameter of the tube at the outer end 8. As shown, the inner wall 26 of the insert is uniformly tapered outwardly from the insert end 7 to the outer end 8. With this modification, the outside taper 24 is transferred to the inner taper 26 and added thereto so as to give an improved nozzle effect as well as a better fit when the insert is positioned within the tube. This modification may, therefore, be described as comprising a polyethylene insert for use with a heat exchanger tube or the like, the insert having inlet and outlet ends and inner and outer walls, the inner wall of the insert being uniformly tapered outwardly from the inlet end to the outlet end and the outer wall being uniformly tapered inwardly from the inlet end to the outlet end, the outside taper of the insert, at least adjacent the inlet end thereof, being in excess of the diameter of the tube so that upon forceable fitting of the insert into the tube the outside taper is effectively added to the inside taper to provide an increased nozzle effect and improved fit to the tube wall due to compression of the oversize tapered outer wall of the insert.

It will be appreciated that the bonnet 9 of the inserts described herein may take a variety of forms depending upon the nature of the tube end. Thus, while the drawings show a flared tube end 5 in which case the bonnet 9 preferably has the form illustrated, the inlet end may be shaped otherwise to accommodate the end of the tube and seal its juncture with the plate 2.

As indicated, the insert described herein comprises polyethylene which has been found uniquely suited for present purposes. Polyethylene is extremely inert and otherwise highly resistant to conditions normally encountered in use. Furthermore, the polymer tends to expand with heat thus making possible, in conjunction with other features of the present insert, a desirable fit without the necessity of using any adhesive or binder. Additionally, polyethylene is sufficiently rigid, even in the form of relatively thin walled inserts (e.g. about .050 inch wall thickness), to facilitate positioning within the tubes to be protected.

Any type of polyethylene may be utilized to make the present inserts. Conventional polyethylene prepared either by the high pressure polymerization procedures described and claimed in U.S. Patents 2,153,553 and 2,188,465 or by low pressure polymerization is preferred but high density polyethylene (density between .935–.940 gram per cc.) or the irradiated form of the polymer are suitable for use.

The expanded portion may be formed on the insert in any convenient manner. Thus, the expansion may be formed in the molding or casting of the insert. In an alternative and preferred method, the preformed insert may be heated and suitably deformed prior to insertion, by means of a heated mandrel, sleeve or other localized heating means suitably designed to produce the desired expansion. In this way, it is possible to locally increase the external diameter of the insert along the desired length without effecting any substantial change in the actual wall thickness.

This application is a continuation-in-part of my copending application Serial No. 617,752, filed October 23, 1956 and now abandoned.

Various modifications may be made in the invention described herein without deviating in any way from the scope thereof as defined in the appended claim wherein:

I claim:

In combination with a tube sheet, a tube of a condenser or the like mounted in said sheet with an open end adjacent said sheet wherein said tube may be internally eroded adjacent said open end, and means fitted into said open end for protecting said tube against further erosion and other deteriorating factors, said means comprising a tubular member of polyethylene inserted within the open end of said tube and engaging the inner wall thereof throughout the inserted length, said member having an inlet end portion positioned adjacent said open end and an outlet end portion inwardly of said tube, said tubular member having its inlet end portion flanged outwardly and covering the joint between said condenser tube and tube sheet, said tubular member being of substantially uniform thickness between said end portions and being free of any significant inward buckling, said outlet end portion having its inner surface flared to provide a feathered edge, said tubular member prior to insertion having an enlarged external diameter in excess of the inner diameter of the tube extending continuously over one-third to two-thirds of the length of the insert beginning adjacent the inlet end; and an external diameter over the remaining length of the insert essentially equal to the inner diameter of the tube, the length of the insert having an external diameter in excess of the tube diameter comprising a cylindrical portion of uniform external diameter adjacent the inlet and a tapered portion intermediate said cylindrical portion and the remainder of said insert, said polyethylene insert having a density of up to about .94 and being further characterized by expandability and flowability of its own accord apart from fluid pressure therein so that said insert was readily inserted into said condenser tube and said enlarged external diameter position flowed into any eroded section in said tube and thereby conformed to the erosion pattern to give a tight fit minimizing further erosion.

References Cited in the file of this patent

UNITED STATES PATENTS

| | | |
|---|---|---|
| 2,225,615 | Bay | Dec. 24, 1940 |
| 2,314,315 | Scheele | Mar. 16, 1943 |